United States Patent [19]

Gardner-Chavis et al.

[11] Patent Number: 4,996,033

[45] Date of Patent: Feb. 26, 1991

[54] CATALYTIC METHOD FOR CONCENTRATING ISOTOPES

[75] Inventors: Ralph A. Gardner-Chavis, Cleveland; Michael P. May, North Canton, both of Ohio

[73] Assignees: Molecular Technology Corporation, Canton; JC Technology, Inc., Dover, both of Ohio

[21] Appl. No.: 434,485

[22] Filed: Nov. 13, 1989

Related U.S. Application Data

[63] Continuation of Ser. No. 176,248, Mar. 31, 1988, abandoned.

[51] Int. Cl.$^5$ .............................. C01B 4/00; C01B 5/00
[52] U.S. Cl. .................................... 423/249; 423/580; 423/647.7; 423/659; 423/DIG. 7; 423/351; 423/460
[58] Field of Search ...................... 423/249, 580, 647.7, 423/DIG. 7, 659, 351, 460

[56] References Cited

U.S. PATENT DOCUMENTS

| 2,690,379 | 9/1954 | Urey et al. | 423/647.7 |
| 2,690,380 | 9/1954 | Taylor | 423/580 |
| 2,780,526 | 2/1957 | Fleck | 423/647.7 |
| 2,787,526 | 4/1957 | Spevack | 423/647.7 |
| 4,178,350 | 12/1979 | Collins et al. | 423/249 |
| 4,196,176 | 4/1980 | Galloway | 423/580 |
| 4,331,522 | 5/1982 | Pierini | 423/580 |
| 4,673,547 | 6/1987 | Iniotakis et al. | 423/647.7 |
| 4,687,644 | 8/1987 | Iniotakis et al. | 423/249 |

FOREIGN PATENT DOCUMENTS

| 1263717 | 3/1968 | Fed. Rep. of Germany | 423/580 |
| 1593961 | 7/1970 | France | 423/580 |
| 99020 | 8/1979 | Japan | 423/249 |
| 1132872 | 11/1968 | United Kingdom | 423/249 |

OTHER PUBLICATIONS

Gardner, R. A., "Intermedions in Catalysis, Spectroscopy and Electron Distribution. Part I. Hydrogen Peroxide" in Journal of Molecular Catalysis, vol. 34, pp. 85-94 (1986).

Gardner, R. A., "Intermedions in Catalysis, Spectroscopy and Electron Distribution. Part II. Hydrogen Peroxide" in Journal of Molecular Catalysis, vol. 34, pp. 95-102 (1986).

Gardner, R. A., and J. Willard, "A New Description of Catalysis Applied to Carbonic Anhydrous and Other Reactions," in Journal of Molecular Catalysis, vol. 34, pp. 103-121 (1986).

Thomas, H. L., "Choose the Best Catalyst for Your Reaction," Research & Development, Feb. 1987.

Thomas, H. L., "Electron-Energy Levels May Affect Catalyst Action," Research & Develoment, Mar. 1987.

Hanson, Lois J., "Predictions of Intermedion Theory Applied to the Isotope Effect," M. S. Thesis, Cleveland State University, Dec. 1984.

*Primary Examiner*—Wayne A. Langel
*Attorney, Agent, or Firm*—Finnegan, Henderson, Farabow, Garrett & Dunner

[57] ABSTRACT

A method for concentrating an isotope from an admixture containing the isotope by contacting the admixture with a catalyst capable of selectively catalyzing a reaction with the isotope, and recovering the concentrated isotope from the reaction products. In one embodiment, the method can be used to concentrate deuterium from sources such as hydrogen-rich gas.

46 Claims, No Drawings

CATALYTIC METHOD FOR CONCENTRATING ISOTOPES

This application is a continuation of application Ser. No. 176,248, filed Mar. 31, 1988, abandoned.

BACKGROUND OF THE INVENTION

The present invention relates to a catalytic method for concentrating isotopes. A more particular application of the method relates to concentrating deuterium using catalysts capable of selectively catalyzing a reaction with a deuterium-containing compound. The present invention finds particular utility in the production of heavy water.

Certain desired isotopes occur naturally but are found only in very low concentrations. There has been a long-felt need to find an efficient and economical process whereby a desired isotope can be concentrated in a substance which contains or is capable of containing the same.

For example, hydrogen-containing substances contain at least two isotopes of hydrogen, namely protium, having an approximate atomic weight of one, and deuterium, having an approximate atomic weight of two. The natural abundance of deuterium in hydrogen gas is given as 0.0150 percent in the "Handbook of Chemistry and Physics," 49th edition (1968-69), published by the Chemical Rubber Company, Cleveland, Ohio. The deuterium present in hydrogen gas is largely in the form of hydrogen deutride (HD) with a much smaller percentage occurring in the form of molecular deuterium ($D_2$). The deuterium content present in natural, untreated water is usually within the range of 0.012 to 0.016 percent depending on the source of the untreated water. The deuterium present in water is largely in the form of hydrogen deuterium oxide (HDO) with a much smaller percentage occurring in the form of deuterium oxide ($D_2O$).

Electrolysis was the first method used commercially to concentrate deuterium. When water is decomposed electrolytically into hydrogen and oxygen, the deuterium content at the cathode is substantially lower than that of the water remaining in the cell. As electrolysis continues, the remaining water becomes progressively enriched in deuterium.

Fractional distillation was another of the early processes used to concentrate deuterium. This process uses differences in vapor pressures to separate deuterium oxide from water.

Several processes have also been described for exchanging isotopes between a fluid and an isotope-containing gas. In U.S. Pat. No. 2,690,379 to Urey et al., processes for accelerating deuterium exchange reactions between liquid water or water vapor and hydrogen gas are described using certain supported metal catalysts. The Urey et al. patent describes several countercurrent and co-current hydrogen exchange systems which are promoted by those catalysts.

In U.S. Pat. No. 2,787,526 to Spevack, a process for concentrating isotopes in water using liquid water and an isotope-containing gas in counter-current flow is described employing reactors which operate at different temperatures. The Spevack patent also describes the use of catalysts to accelerate the exchange reaction.

Neither Urey et al. nor Spevack, however, uses catalysts to selectively catalyze a reaction with an isotope or a isotope-containing compound. Instead, these processes simply use catalysts to accelerate equilibration.

Each of these prior art processes for the concentration of isotopes is extremely expensive. They each require massive quantities of energy or huge processing facilities or both. To date, a process for the concentration of isotopes, such as deuterium, using only moderate quantities of energy and requiring only limited processing equipment has not been developed.

SUMMARY OF THE INVENTION

The present invention overcomes the problems and disadvantages of the prior art by providing a catalytic method for concentrating an isotope using catalysts capable of selectively catalyzing a reaction with the isotope. The invention is particularly useful to concentrate deuterium from sources such as hydrogen rich gas. The invention can also be used to concentrate isotopes such as tritium, carbon-13, nitrogen-15, and others. The reaction process is much simpler than the prior art processes and requires only moderate energy input and limited processing equipment. The invention produces a concentrated product that, in the case of deuterium, can be further concentrated by conventional methods to produce heavy water at a significant savings over the prior art processes.

Additional objects and advantages of the invention will be set forth in part in the description that follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as broadly described herein, an isotope may be concentrated from an admixture containing the isotope by contacting the admixture with a catalyst capable of selectively catalyzing a reaction with the isotope, and recovering the concentrated isotope from the reaction products.

As embodied herein, deuterium may be concentrated from an admixture containing a deuterium compound by reacting the admixture with a deuterium reactant in the presence of a catalyst capable of selectively catalyzing a reaction between the deuterium compound and the reactant, and recovering concentrated deuterium from the reaction products.

In one embodiment, deuterium may be concentrated from an admixture containing hydrogen deuteride by reacting the admixture with a source of oxygen in the presence of a catalyst capable of selectively catalyzing the oxidation of hydrogen deuteride, and recovering concentrated deuterium from the reaction products.

In another embodiment, deuterium may be concentrated from an admixture containing hydrogen deuteride by reacting the admixture with a reactant capable of undergoing hydrogenation in the presence of a catalyst capable of selectively catalyzing the reaction between hydrogen deuteride and the reactant to form a deuterated reaction product, reacting the deuterated reaction product with a source of oxygen, and recovering concentrated deuterium from the final reaction products.

As further embodied herein, deuterium may be concentrated from an admixture containing hydrogen deuteride by reacting the admixture with a reactant selected from ethene, acetylene, and their homologues in the presence of a catalyst capable of selectively catalyzing the reaction between hydrogen deuteride and the reactant to form a deuterated reaction product, reacting the deuterated reaction product with source of oxygen, and recovering concentrated deuterium from the final reaction products.

In yet another embodiment, deuterium may be concentrated from an admixture containing hydrogen deuteride by contacting the admixture with a catalyst capable of selectively adsorbing hydrogen deuteride and capable of catalyzing the oxidation of hydrogen deuteride, reacting the adsorbed hydrogen deuteride with a source of oxygen, and recovering concentrated deuterium from the final reaction products.

DETAILED DESCRIPTION OF THE INVENTION

In accordance with the invention, an admixture containing an isotope is first contacted with a catalyst capable of selectively catalyzing a reaction with the isotope. The isotope may be selected from any isotope capable of enrichment by this method, including both naturally occurring and artificially produced isotopes.

Where the isotope is deuterium, the deuterium can be concentrated from any admixture of molecules and compounds that contains a deuterium compound. The deuterium compound may be any compound containing a deuterium atom. In a preferred embodiment, the admixture is a hydrogen rich gas containing hydrogen deuteride. Such an admixture will also contain traces of molecular deuterium and may contain other molecules and compounds as well. In some instances, it may be desireable to purify the hydrogen rich gas to avoid the production of impurities during the catalytic reaction. In a most preferred embodiment, the admixture is a hydrogen rich gas such as the hydrogen stream used in the production of ammonia, the hydrogen produced by hydrogen generators, or the hydrogen process stream of oil refineries. Using the processes disclosed herein, the deuterium may be extracted from such hydrogen rich gas, and the hydrogen returned to the gas stream.

In accordance with the invention, the catalysts to be used are those catalysts capable of selectively catalyzing a reaction with an isotope within an admixture. A catalyst is capable of selectively catalyzing such a reaction when it enables a reaction with the isotope to proceed faster than reactions with other components of the admixture.

Although it has long been believed that isotopes of a given element react similarly and, therefore, could not be separated by selective reaction, it has now been discovered that catalysts exist that enable such selective reaction. It has been found that this selective reaction can take place through a variety of reactions in the presence of a variety of catalysts. Catalysts useful in this invention have been found to be those that fit within a theory of catalysis known as the Intermedion Theory of Adsorption and Catalysis, which is described in the *Journal of Molecular Catalysis*, vol. 34, pp. 85–121 (1986), herein incorporated by reference.

Catalysts can be predicted according to the intermedion theory of adsorption by applying the hypothesis of R. R. Myers that "synchronization of vibration frequencies of molecules will facilitate their reaction." According to the theory, reactants become associated with the metal such that their vibrational frequencies or energies are perturbed by proximity to the metal. A metal that perturbes the frequencies in a way that enables such synchronization of vibration frequencies acts as a catalyst.

The first step in the catalyst prediction process is the identification of reactants for possible reaction mechanisms to achieve separation of the desired isotope.

The next step in the catalyst prediction process is the development of equations describing intermedions of the reactants that relate the vibrational frequencies of intermedions to the number of their outer-shell electrons. An intermedion is a weakly bonded adsorbate (i.e., readily removed by evacuation at room temperature) that has a vibrational frequency corresponding to a non-integral number of electrons. The fraction of the nonintegral number is the perturbation fraction of the metallic component of the adsorbant. The equations typically are a right hyperbola of the form:

$$(v - \overline{v})(e - \epsilon) = k$$

wherein $v$ is the vibrational frequency $e$ is the corresponding number of electrons, $\overline{v}$ and $\epsilon$ are the asymptotes of the hyberbola, and

$k$ is the curvature.

The three constants in the equation require three data points to be determined. These data points can frequently be found in the literature or derived. In the case of carbon monoxide, for example, the vibrational frequency of the neutral carbon monoxide molecule with 10 valence electrons is 2143.27 cm$^{-1}$ [Ref: E. K. Plyler, L. R. Blaine, and W. S. Conner, *J. Opt. Soc. Am.*, 45, 102 (1955)] and the vibrational frequency of the positive ion of carbon monoxide with 9 valence electrons is 2183.90 cm$^{31\ 1}$ [Ref G. Herzberg, "Molecular Spectra and Molecular Structure I, Spectra of Diatomic Molecules," D. Van Nostrand Co., Inc., Princeton, N.J., 1955, p. 522]. The third point is the number of electrons at which the vibrational frequency becomes zero—the point of dissociation of the molecule into ions. For carbon monoxide, the number of electrons at which $v=0$ is 12.0000.

From these points, the equation for carbon monoxide can be derived to relate the vibrational frequencies of molecules and their ions to the number of outer shell electrons. The equation for carbon monoxide is $$[v\text{CO}) - 2269.96][e(\text{CO}) - 12.1182] = 268.309$$

where $v$ is the vibrational frequency of the adsorbate, and $e$ is equal to the number of valence electrons in the adsorbate.

Applying a similar approach, it has been determined that the hydrogen deuteride equation corresponding to apparent removal of electrons from the bonding molecular orbital of the neutral hydrogen deuteride molecule is $$[v(\text{HD}) - 16486.18331][e(\text{HD}) + 6.93282] = -114295.7414$$

and that the hydrogen deuteride equation corresponding to the apparent addition of electrons to the antibonding molecular orbital of the neutral hydrogen deuteride molecule is $$[v(n-HD) - 4620.1939][e(n-HD) - 4.50353] = 2683.09272.$$

The third step in the catalyst prediction process is simultaneous solution of equations relating vibrational frequency to numbers of valence electrons for two reacting intermedions. The method of simultaneous solution is best explained by substituting for "e," "I +f" giving for reactants "A" and "B"

$$(v_A - \Sigma_A)(I_A + f - \epsilon_A) = k_A$$
and
$$(v_B - \Sigma_B)(I_B + f - \epsilon_B) = k_B.$$

These two equations are solved to determine the values of "f" (a decimal fraction) which make the ratios of $v_A$ to $v_B$ or $v_B$ to $v_A$ equal to $2^n$. The values of the integers $I_A$ and $I_B$ range from two minus the number of electrons on the neutral molecule to one plus the number of electrons on the neutral molecule. For example, integers for carbon monoxide are 8, 9, 10, 11; for oxygen, "$O_2$", 10, 11, 12, 13; for molecular hydrogen, "$H_2$", 0, 1; for ethene, 10, 11, 12, 13; for acetylene, 8, 9, 10, 11, for oxygen atoms, "O", 4, 5, 6, 7 etc. Fractions, "f" may, of course, range from 0–1. Equations for atoms such as C, N, O, F are straight lines of the form:

$$v_o = k_o(8 - e_o)$$

Equations for $H_2$ and $O_2$ involving an apparent loss of bonding electrons are straight lines through the origin, (0, 0) of the form $$v_{H2} = k_{H2} e_{H2}.$$

In each case "e" is rewritten as "I+f" etc. The set of solutions, "f's," are termed "optimum" fractions for the reaction. These are the fractions which make the vibrational frequencies of the two intermedions in synchronization, as required by the Myers Hypothesis as a criterion for reaction.

The next step in catalyst prediction process is the identification of perturbation fractions for various potential catalysts. These fractions for various metals are set forth in Table I.

TABLE I

| Perturbation Fractions and Corresponding Gaseous Ions | | | |
|---|---|---|---|
| Gaseous Ions | Metal | Perturbation Fraction | Oxidation State |
| II | V | .0412 | +1, +2 |
| II | Ti | .0629 | +1, +2 |
| II | Sc | .0888 | +1, +2 |
| III | Cr | .0977 | +2, +3 |
| III | V | .1187 | +3, +4 |
| III | Ti | .1462 | +3, +4 |
| IV | Mn | .1562 | +3, +4 |
| II | Gd | .1910 | +1, +2 |
| IV | Cr | .2001 | +4, +5 |
| III | Sc | .2128 | +3, +4 |
| II | Tm | .2171 | +1, +2 |
| II | Nb | .2206 | +1, +2 |
| III | Gd | .2212 | +3, +4 |
| IV | V | .2482 | +5 |
| II | Fe | .2587 | +1, +2 |
| II | Zr | .2617 | +1, +2 |
| II | Er | .2696 | +1, +2 |
| II | Rr | .2802 | +1, +2 |
| V | Mn | .2893 | +5, +6 |
| III | Fe | .3083 | +3 |
| IV | Ti | .3186 | +5 |
| II | Sm | .3196 | +1, +2 |
| | Cu | .3241 | ous, ic |
| | Zn | .3247 | ous, ic |
| II | Nd | .3311 | +1, +2 |
| II | Pm | .3311 | +1, +2 |
| III | Sm | .3342 | +3, +4 |
| | Cd | .3546 | ous, ic |
| II | Ho | .3560 | +1, +2 |
| V | Cr | .3655 | +6 |

TABLE I-continued

| Perturbation Fractions and Corresponding Gaseous Ions | | | |
|---|---|---|---|
| Gaseous Ions | Metal | Perturbation Fraction | Oxidation State |
| III | Nb | .3892 | +3, +4 |
| II | Dy | .4577 | +1, +2 |
| III | Zr | .4684 | +3, +4 |
| | Ca | .4964 | ous, ic |
| IV | Mn | .5070 | +7 |
| III | Y | .5149 | +3, +4 |
| III | Co | .5423 | +3 |
| IV | Mo | .5451 | +3, +4 |
| | Ag | .5670 | ous, ic |
| II | Tb | .5730 | +1, +2 |
| II | Ce | .5887 | +1, +2 |
| II | Y | .5973 | +1, +2 |
| II | Co | .6221 | +1, +2 |
| II | La | .6484 | +1, +2 |
| III | Nd | .6791 | +3, +4 |
| IV | Sm | .6837 | +5 |
| II | Ta | .7120 | +1, +2 |
| III | Ru | .7416 | +3, +4 |
| IV | Ni | .7454 | +4, +5 |
| | Rh | .7965 | ous, ic |
| | Au | .8034 | ous, ic |
| III | Pd | .8120 | +2, +3 |
| IV | Zr | .8157 | +5 |
| III | Pr | .8182 | +3, +4 |
| III | Ni | .8595 | +2, +3 |
| | Pt | .8662 | ous, ic |
| IV | Nd | .8811 | +5 |
| III | La | .8941 | +3, +4 |
| III | Dy | .8981 | +3, +4 |
| III | Ce | .9030 | +3, +4 |
| | Na | .9000 | ous, ic |
| | K | .8944 | ous, ic |
| II | Ru | .9370 | +1, +2 |
| V | Mo | .9893 | +5, +6 |

These perturbation fractions were derived as follows: Perturbation fractions were first observed during a study of adsorption of carbon monoxide by infrared spectroscopy. It was observed that a certain group of adsorbates on adsorbents containing a certain metal which were weakly bonded to the surface, that is readily removed by evacuation, displayed vibrational frequencies which, according to the above equation for carbon monoxide corresponded to numbers of electrons with difference integers but a constant fraction, within experimental error. For example, infrared frequencies for CO on absorbents containing nickel or nickel oxide, were at 2188, 2058, and 1230 cm$^{-1}$. These frequencies correspond to 8.84, 10.85, and 11.86 electrons according to the above equation. Similar fractions for iron, cobalt, and chromium containing adsorbents were 0.25, 0.62, and 0.10, respectively. These four metals were observed to have ions listed in the Atomic Energy Levels Tables which show low-lying excited electron levels close to the ground estate. These levels were summed by a truncated Boltzmann equation:

$$U = \sum_{\substack{n=1 \\ n \neq 0}}^{n=\infty} (2J_n + 1)\exp\left(-\frac{hc\, v_n}{kT}\right)$$

to yield a number proportional to the "accessibility" of the excited electron states, being larger, the closer the states are to the ground state. A graph of the logarithm of "U" versus the perturbation fraction for the four metals produced a straight line over the range of fractions, from 0.10 to 0.86 and over four decades of ten on the "U" axis, the ordinate. This result conclusively and completely stated that the perturbation fractions were the result of electrons of the metal spending a fraction of time in the low lying levels and thus appearing to be a fraction of an electron. From this relation it was possible to calculate "U" from the Atomic Energy Levels Tables for all metal ions having low-lying exerted states and convert these into perturbation fractions. However, this graph and resulting relationship between the perturbation fraction and "log U" were based upon fractions known only to two significant figures: accuracy, to four significant figures, i.e. four decimal places, was obtained from the simultaneous solutions of the equations of pairs of reacting intermedions when metals reported in the literature were predicted as catalysts. For example, if iron is known by experiment to be an efficient catalyst for the hydrogenation of acetylene and the only "optimum fraction" in the region of 0.25 is 0.2587, then this is assumed to be the fraction for iron, especially when it is confirmed by similar analyses of many other reactions.

In Table I, the lower of the two oxidation states or the "ous" state corresponds to odd integers for even atoms or molecules, that is, atoms or molecules having an even number of protons and the higher of the two oxidation states or the "ic" state corresponds to even integers for even atoms or molecules; the reverse is true for atoms or molecules possessing an odd number of protons. The number of protons for a molecule is the combined total of protons of its constituent atoms. The "integers" referred to above are the integers corresponding to the vibrational frequency of the absorbate or reactant. It may be noted that the equations describing intermedions also contain the vibrational frequencies of the neutral molecule and positive and negative ions. These are intermedious with integral numbers of electrons. Metals whose oxidation states are indicated as "ous" and "ic" do not show low-lying excited electron states in the Atomic Energy Levels Tables, and, therefore, cannot be assigned a numerical oxidation state.

The last step in the catalyst prediction process involves the comparison of optimum fractions with all known perturbation fractions of potential catalysts. If this comparison results in a match or agreement within about ±0.01 of a percent, more preferably within about ±0.002 of a percent, then it can be stated that the potential catalyst should catalyze the reaction between the reactants to form some appropriate product, providing that the free energy change is appropriate.

The basis for application of intermedion theory to isotopes depends on the experimental artifact that vibrational frequencies of molecules vary as a function of changes in atomic mass. Isotopes, by definition, are chemical entities that differ in atomic mass. If the atomic mass of two isotopes are sufficiently different to affect a variation in the vibrational frequencies of the pair, then each isotope may exhibit distinct chemical properties. This distinctiveness is not specific for neutral molecules; vibrational frequencies of isotopic intermedions, on a given adsorbent, will also be sufficiently different. Each isotopic adsorbate will be reactive toward other adsorbates, catalyzed by and dependent upon the metallic component of the adsorbent.

Thus, isotopes with relatively small atomic mass can most easily be separated. Preferred isotopes that can be concentrated with particular effectiveness using this invention are those having an atomic weight less than about 22, including deuterium, tritium, carbon-13, and nitrogen-15.

The ligands associated with the catalysts useful in this invention may be any ligands that are compatible with their catalytic action. Ligands, as that term is used herein, are any atom or complex of atoms sufficiently closely associated with or attached to the particular metal or metals under consideration to alter or effect its chemical and/or catalytic behavior. Thus in an alloy of two or more metals each metal acts as a ligand to the others. Preferred ligands include oxides, sulfides, and sulfates, phosphates, chlorates, perchlorates, sulfites, thiosulfates, chlorides, bromides, iodides, fluorides, silicates, nitrates, as well as organic moieties which produce an organometallic compound, and intermetallic compounds, i.e. bimetallic compounds, and cluster compounds. Selection of a ligand will depend upon the desired oxidation state of the catalyst and upon desired electron donor/acceptor properties to generate the appropriate intermedion for the desired reaction. Such selection will be a matter of routine for those skilled in the art.

In addition, the catalyst may not only be in the form of a solid, a heterogeneous catalyst, but may also be a homogeneous catalyst, that is, soluble in a suitable solvent, a colloidal suspension or an enzyme with its natural metallic component or "co-factor" or an altered enzyme containing a metal, synthetically replacing the natural metal. Catalysts in the 1 and +2 oxidation states may be stablized in certain inorganic compounds, certain cluster compounds, and even on a metal surface, most appropriately a highly dispersed metal to afford a high surface area as is obtained in an aerogel of metal on a support such as silica or alumina.

The catalysts useful in this invention may be conditioned prior to their use in any conventional manner that will facilitate the catalyst's activity. In a preferred embodiment, the catalyst is conditioned immediately prior to initiation of the reaction to a preferred oxidation state. For example, a lower oxidation state may be obtained by exposing the catalyst to carbon monoxide. In addition, in the preferred embodiment, the catalyst is heated, and optionally exposed to nitrogen, to drive off any mixture before the reaction is initiated.

Where the isotope is deuterium, deuterium may be concentrated from an admixture containing hydrogen deuteride by reacting the admixture with a source of oxygen in the presence of a catalyst capable of selectively catalyzing the oxidation of hydrogen deuteride to form hydrogen deuterium oxide. This reaction can be expressed as:

$$2HD + O_2 \rightarrow 2HDO.$$

The source of oxygen used in the reaction with the hydrogen deuteride may be any molecule or compound capable of providing oxygen to the reaction, but is most preferably simply dry air. A similar reaction may be carried out with molecular deuterium to form deuterium oxide.

As embodied herein, the catalysts to be used in the reaction between the admixture containing hydrogen deuteride and oxygen can be any catalyst capable of selectively catalyzing the reaction between hydrogen deuteride and oxidation. Preferred catalyst are selected from vanadium in the +2 oxidation state, chromium in the +3 oxidation state, zinc in the +2 oxidation state, state, praesodymium in the +3 oxidation state, and compounds thereof. Because only a very small quantity of catalyst is required to catalyze the reaction, compounds of vanadium, chromium, zinc, and praesodymium which appear to be in other oxidation states, but which in fact have a small quantity of the preferred oxidation state, may also be useful catalysts. Most preferably, the catalysts are $Cr_2O_3$ and $ZnO$, both of which are commercially available from Harshaw/Filtrol Partnership in Cleveland, Ohio, and United Catalysts Inc. of Louisville, Kty., respectively.

The reaction conditions under which the reaction between hydrogen deuteride and oxygen takes place may be any reaction conditions under which the reaction proceeds and the reaction with hydrogen deuteride takes place faster than the reaction with other components of the admixture, notably hydrogen (protium). In a preferred embodiment, the reaction temperature is less than 700° F. At temperatures greater than 700° F, it has been found that the rate of reaction between hydrogen (protium) and oxygen increases faster than the rate of reaction between hydrogen deuteride and oxygen, and the concentration of hydrogen deuterium oxide in the reaction products decreases. In a most preferred embodiment, the temperature is between 500° and 600° F.

The pressure at which the reaction between the admixture of hydrogen and hydrogen deuteride with oxygen takes place may be atmospheric pressure, but is preferably a pressure greater than atmospheric pressure. It will be understood by those skilled in the art that temperature and pressure are interrelated and that temperatures optimum for production of hydrogen deuterium oxide may vary with pressures and vice versa.

The products of the reaction between the admixture containing hydrogen deuteride and oxygen will include compounds in addition to hydrogen deuterium oxide. The admixture most commonly will contain large quantities of hydrogen (protium). Although the reaction is selective for hydrogen deuteride, some hydrogen (protium) will react with the oxygen to form water. In addition, if there are impurities in the admixture, there may be impurities among the reaction products as well. In the most preferred embodiment, however, the reaction conditions are chosen so that light water production and impurities are minimized.

Following the reaction between hydrogen deuteride and oxygen, concentrated deuterium, principally in the form of hydrogen deuterium oxide, may be recovered from the reaction products by any suitable means. In a preferred embodiment, the reaction products are condensed by cooling, such as in a dry ice/acetone bath. The condensate contains hydrogen deuterium oxide and light water. In addition, because hydrogen deuterium oxide and deuterium oxide are in a state of equilibrium, the condensate will contain deuterium oxide as well.

In another embodiment of the invention, deuterium may be concentrated by reacting an admixture containing hydrogen deuteride with a reactant capable of undergoing hydrogenation in the presence of a catalyst capable of selectively catalyzing the reaction between hydrogen deuteride and the reactant to form a deuterated reaction product, reacting the deuterated reaction product with a source of oxygen to form hydrogen deuterium oxide, and recovering concentrated deuterium from the final reaction products. The compounds capable of undergoing hydrogenation may be any unsaturated organic compound containing a double or a triple bond, such as alkenes, alkynes, benzenes, aldehydes, ketones, esters, and nitriles. In a more preferred embodiment, the compounds capable of undergoing hydrogenation are selected from ethene and its homologues, such as propene, butene, pentene, hexene, etc., and from acetylene and its homologues, such as propyne, 1-butyne, 2-butyne, 1-pentyne, 2-pentyne, 3-methyl-1-butyne, etc. In a most preferred embodiment, the compounds are selected from ethene and acetylene.

In the case of ethene, the reaction with hydrogen deuteride is believed to form deuterated ethane and can be expressed as:

$$HD + C_2H_4 \rightarrow C_2H_5D.$$

The subsequent reaction between deuterated ethane and oxygen can be expressed as:

$$C_2H_5D + 7/2O_2 \rightarrow 2CO_2 + 2H_2O + HDO.$$

As embodied herein, the catalysts to be used in the reaction between an admixture containing hydrogen deuteride and ethene or its homologues can be any catalyst capable of selectively catalyzing the reaction hydrogen deuteride and ethene. Preferred catalyst are selected from compounds of chromium in the +2, +3, and +6 oxidation states, yttrium in the .1 oxidation state, zirconium in the +4 oxidation date, and gadolinium in the +1 oxidation state. Compounds of chromium, yttrium, zirconium, and gadolinium that appear to be in other oxidation states, but which in fact have a small quantity of the preferred oxidation state, may also be useful. Most preferably, the catalysts are Harshaw/Filtrol Partnership in Cleveland, Ohio.

Where an admixture containing hydrogen deuteride is reacted with acetylene, the reaction is believed to form deuterated ethene and can be expressed as:

$$HD + C_2H_2 \rightarrow C_2H_3D.$$

The deuterated ethene can then be reacted with oxygen, and the reaction can be expressed as:

$$C_2H_3D + 3O_2 \rightarrow 2CO_2 + H_2O + HDO.$$

Alternatively, the deuterated ethene can be further reacted with hydrogen deuteride to form $C_2H_4D_2$, and then reacted with oxygen.

As embodied herein, the catalysts to be used in the reaction between an admixture of hydrogen deuteride and acetylene or its homologues can be any catalyst capable of selectively catalyzing the reaction between hydrogen deuteride and acetylene. Preferred catalysts are selected from compounds of calcium in the 2 oxidation state, titanium in the +2 oxidation state, and lanthanum in the +3 oxidation state. Compounds of calcium, titanium, and lanthanum that appear to be in other oxidation states, but which in fact have a small quantity of the preferred oxidation state, may also be useful.

The reaction conditions under which a reaction between an admixture containing hydrogen deuteride and a reactant capable of undergoing hydrogenation takes place may be any reaction conditions under which the reaction proceeds and the reaction with hydrogen deuteride proceeds faster than the reaction which with other components of the admixture, notably hydrogen (protium). In a preferred embodiment, the reaction temperature is less than 500° F. In a most preferred embodiment, the temperature is between ambient and 300° F. The pressure at which the reaction takes place may be atmospheric pressure, but is preferably a pressure greater than atmospheric pressure.

The products of a reaction between an admixture containing hydrogen deuteride and a reactant capable of undergoing hydrogenation may include compounds in addition to deuterated reaction products. Although the reaction is selective for hydrogen deuteride, some hydrogen (protium) may react with the reactant. In addition, if there are impurities in the hydrogen stream, there may be impurities among the reaction products as well. In the most preferred embodiment, however, the reaction conditions are chosen so that production of the deuterated reaction product is maximized and impurities are minimized.

Following a reaction between hydrogen deuteride and a reactant capable of undergoing hydrogenation, the deuterated reaction product is reacted with a source of oxygen. In a preferred embodiment, the deuterated reaction product is first recovered by a suitable means, such as condensation by cooling in liquid nitrogen. The deuterated reaction product is then mixed with air and reacted in the presence of any oxidation catalyst, which, in some cases, may be the same catalyst used for the hydrogenation reaction.

As embodied herein, the reaction conditions under which a reaction between a deuterated reaction product and oxygen takes place may be any reaction conditions under which hydrogen deuterium oxide is formed. In a preferred embodiment, the reaction temperature is less than 700° F. In a most preferred embodiment, the temperature is between 500° and 600° F. The reaction between the deuterated reaction product and oxygen may take place at any pressure.

The products of the reaction between the deuterated reaction product and oxygen will include compounds in addition to hydrogen deuterium oxide. For example, some of the hydrogen (protium) atoms in the deuterated reaction product may react with the oxygen to form water. Thus, reactants with a small number of hydrogen atoms, such as ethene and acetylene, are preferred. Where, for example, homologues of ethene and acetylene are used in the reaction, more water will be produced because of the presence of additional hydrogen (protium) atoms.

Following the reaction of a deuterated reaction product with oxygen, concentrated deuterium, principally in the form of hydrogen deuterium oxide, may be recovered by any suitable means. In a preferred embodiment, the reaction products are condensed by cooling, such as in a dry ice/acetone bath. The condensate contains hydrogen deuterium oxide, water, and a small percentage of deuterium oxide in equilibrium with the hydrogen deuterium oxide.

As further embodied herein, deuterium may be concentrated from an admixture containing hydrogen deuteride by reacting the admixture with a source of oxygen in the presence of a catalyst capable of selectively adsorbing hydrogen deuteride and capable of catalyzing the oxidation of hydrogen deuteride. As embodied herein, the catalysts to be used in this reaction can be any catalyst capable of selectively adsorbing hydrogen deuteride and capable of catalyzing the oxidation of hydrogen deuteride. Most preferably, the catalyst is $Cr_2O_3$.

The adsorption of hydrogen deuteride onto the catalyst takes place as a first reaction step. The reaction conditions under which the adsorption takes place may be any reaction conditions under which hydrogen deuteride is selectively adsorbed onto the catalyst. Most importantly, where the admixture contains a large quantity of hydrogen (protium), the hydrogen deuteride is adsorbed preferentially over hydrogen (protium). In a preferred embodiment, the reaction temperature is between ambient and 300° F.

As a second step, after the hydrogen deuteride has been adsorbed onto the catalyst, the catalyst is exposed to a source of oxygen. The hydrogen deuteride reacts with oxygen and is desorbed. Most preferably, the source of oxygen is dry air. The reaction conditions under which the reaction with oxygen and desorbtion takes place may be any conditions under which these reactions take place. Most preferably, the reaction between adsorbed hydrogen deuteride with a source of oxygen is carried out at temperature of between 500° and 900° F.

The reaction products of this hydrogen deuteride oxidation and desorption will include hydrogen deuterium oxide. Although the reaction is selective for hydrogen deuteride, some hydrogen (protium) will react with oxygen to form water.

Following desorption, concentrated deuterium, principally in the form of hydrogen deuterium oxide, may be recovered from the reaction productions by any suitable means. In a preferred embodiment, the reaction products are condensed by cooling. The condensate contains hydrogen deuterium oxide and water as well as a small percentage of deuterium oxide in equilibrium with the hydrogen deuterium oxide.

In the preferred embodiments, the concentration of deuterium recovered according to the invention may have a concentration at least ten times, and more preferably at least fifteen times, greater than the concentration of deuterium in the admixture before the reaction. If desired, the concentrated deuterium may then be further concentrated or purified by any conventional means such as electrolysis or fractional distillation. The cost of these purification processes, however, will be greatly reduced by starting with a concentrated product.

For a clearer understanding of the invention, specific examples are set forth below. These examples are merely illustrative and are not to be understood as limiting the scope and underlying principles of the invention in any way.

EXAMPLE 1

A continuous flow experiment was performed with an experimental test apparatus consisting of the following equipment:

Reactant tank—4 foot long, 4 inch diameter, internal volume of 1,000 cubic inches, carbon steel construction;

Pressure Regulator—for regulating the flow of reactants from the reactant tank;

Critical Flow Orifices—two critical flow orifices for smoothing the flow rate;

Glass Reactor—internal volume 700 cc, bottom inlet, top outlet on side, wrapped with a heating tape and fiberglass tape;

Power Supply—to heat the glass reactor;

Variac—to vary the voltage from the power supply to the heating tapes and control temperature;

Thermocouple—attached to the glass reactor through a rubber stopper in the top with LED readout;

Condenser—consisting of a tube condenser and a Dewar Flask;

2,000 ml graduated cylinder—for flow rate determination; and

Valves and tubing.

In operation, reactants from the reactant tank passed through the pressure regulator and the first critical flow orifice into the glass reactor. The glass reactor was heated by the power supply as controlled by the variac. The reaction products passed to a condenser and passed through a second critical flow orifice and then either were vented or passed into the inverted graduated cylinder which was used for flow rate determination. The reactant tank was flushed six times with hydrogen gas and vented. The reactant tank was then charged with deuterium to 6.1 psig, subsequently with oxygen to 15.1 psig, and finally with hydrogen to 120 psig. This produced an admixture having a ratio of hydrogen:deuterium:oxygen (H:D:O) of approximately 20:1:3.

Approximately 360 cc (603.75 g) of zinc oxide catalyst was introduced into the glass reactor. This catalyst was purchased from United Catalysts Inc. and is identified as G-72D, 3/16" pellets. The manufacturer's specifications for this catalyst are as follows:

| L.O.I. 1000° F., % | 5.0 |
| --- | --- |
| ZnO, % | 90.0 |
| Carbon, % | 0.20 |
| Sulfur, % | 0.15 |
| Chlorides, % | 0.03 |
| $Al_2O_3$, % | 3–7 |
| CaO, % | 0.5–3.0 |
| $SiO_2$, % | 0.15 |
| Other heavy metals, % | 0.10 |
| Bulk density, lbs/cu. ft. | 70 |
| Surface area, $m^2/g$ | 35 |
| Pore volume, cc/g | 0.2–0.3 |
| Crush strength, lbs. | 15 |

The catalyst was then prepared by exposing the catalyst to carbon monoxide to condition the catalyst to the +2 oxidation state and by heating the catalyst to a temperature of about 571° F. to drive off any moisture.

The reactant feed to the glass reactor was then turned on and held constant. A flow rate 210 cc/min was maintained until the tank pressure was insufficient to maintain this flow. Flow was continued until all the flow ceased. Initial temperature of the glass reactor was 565° F. and increased to 577° F. during the reaction. Pressure was atmospheric pressure.

The reaction products which exited the reactor entered the condenser which was submersed in dry ice/acetone bath. Condensate yield was 10.13 grams. The outlet gas from the condenser then was vented to the atmosphere. Intermittently the flow rate was checked by diverting the outlet gas from the condenser into an inverted 2,000 cc graduated cylinder filled with water. The water displacement was timed with a stop watch and the flow rate was obtained.

The condensate in the condenser was analyzed at the conclusion of the experiment with an FTIR infrared spectrometer (Analect Instruments Model No. FX6260 with computer and color CRT). The concentration of deuterium atoms in the condensate was measured in five samples and found to average 15%. This corresponds to a 30% efficiency in extracting the deuterium atoms from the reactant admixture.

EXAMPLE 2

A continuous flow experiment with the same experimental apparatus used in Example 1 was performed with the exception that the outlet gas from the condenser was bubbled through a column of mercury of 27.6 inches to create an operating pressure of approximately two atmospheres. The reactant tank was flushed with hydrogen and then charged with deuterium to 6.0 psig, subsequently with oxygen to 15.0 psig, and finally with hydrogen to 120 psig. This produced an admixture having a ratio of hydrogen:deuterium:oxygen (H:D:O) of approximately 20:1:3.

Zinc oxide catalyst identical to that used in example 1 was prepared by exposing the catalyst to hydrogen to condition the zinc to the +2 oxidation state and by heating the catalyst to a temperature of 588° F. to drive off any moisture.

The reactant feed to the glass reactor was then turned on and held constant. A flow rate of 147 cc/min was maintained until pressure in the reactant tank was insufficient to maintain this flow. Flow was continued until all flow ceased. Initial temperature of the glass reactor was 598° F. and decreased to 572° F. during reaction.

The reaction products that exited the reactor were condensed and analyzed as in Example 1. Condensate yield was 11.25 g. The concentration of deuterium atoms in the condensate was found to be 21%. This corresponds to a 52.9% efficiency in extraction of the deuterium atoms from the reactant admixture.

EXAMPLE 3

A continuous flow experiment with the same experimental apparatus used in Example 1 was performed. The reactant tank was flushed with hydrogen and then charged with deuterium to 6.0 psig, subsequently with oxygen to 15.0 psig, and finally with hydrogen to 120 psig. This produced an admixture having a ratio of hydrogen:deuterium:oxygen (H:D:O) of approximately 20:1:3.

Approximately 100 cc (95.3 g) of catalyst was added to the glass reactor. This catalyst was obtained from Harshaw/Fitrol and is identified as Cr-0211T, ⅜". The manufacturer's specification for this catalyst is as follows:

| L.O.I. 700° C., % | 0.5 |
| --- | --- |
| $Cr_2O_3$, % | 18.0 |
| $ZrO_2$, % | 0.25 |
| $Al_2O_3$, % | 82.0 |
| A.B.D., g/cc, packed | 1.20 |
| Surface area, $m^2/g$ | 0.29 |
| Pore volume, cc/g | 0.29 |
| Avg. side crushing strength, lbs. | 19 |

The catalyst was prepared by exposing the catalyst to carbon monoxide for approximately 200 minutes to condition the chromium to the +3 oxidation state and by heating the catalyst to a temperature of 594° F. to drive off any moisture.

The reactant feed to the glass reactor was then turned on and held constant. A flow rate of 142 cc/min was maintained until pressure in the tank was insufficient to maintain this flow. Flow was continued until all flow ceased. Initial temperature of the glass reactor was 590° F. and decreased to 575° F. during the reaction.

The reaction products that exited the reactor were condensed and analyzed as in Example 1. Condensate yield was 13.38 g. The concentration of deuterium atoms in the condensate was found to be 18.7%. This corresponds to a 51.1% efficiency in extraction of the deuterium oxide from the reactant admixture.

EXAMPLE 4

A continuous flow experiment with the same experimental apparatus used in Example 1 was performed. The reactant tank was flushed with hydrogen and then charged with deuterium to 6.0 psig, subsequently with ethene to 9.0 psig, and finally with hydrogen to 100 psig. This produced an admixture having a ratio of hydrogen:deuterium:ethene of approximately 20:1:0.5.

Approximately 360 cc (378 g) of chromium oxide catalyst identical to that used in example 3 was added to the glass reactor. The catalyst was prepared by exposing the catalyst to carbon monoxide for 16 hours to condition the chromium to the +3 oxidation state and by heating the catalyst to a temperature of 530° F. to drive off any moisture.

The reactant feed to the glass reactor was turned on and held constant. A flow rate of 30 cc/min was maintained for three hours and then increased to 50 cc/min until a sufficient amount of product for analysis was produced. At this time, the flow rate was shut off, and the reactant tank pressure was noted to be 90 psig. Initial temperature of the glass reactor was 300° F. and decreased to 239° F. during the reaction.

The reaction products that exited the reactor were condensed in liquid nitrogen. A vacuum was then pulled on a second reactant tank. The condensate was removed from the liquid nitrogen and vaporized into the second reactant tank. The second reactant tank was then charged with dry air to 75 psig.

The catalyst in the glass reactor was heated to a temperature of 575° F. The feed from the second reactant tank was then turned on and held constant. A flow of approximately 200 cc/min was maintained until the pressure in the reactant tank was insufficient to maintain this flow. Flow continued until all flow ceased. Initial temperature of the glass reactor was 575° F. and increased to 680° F. during the reaction. The reaction products that exited the reactor were condensed in dry ice. Since only the ethene and deuterated ethane were condensed in the liquid nitrogen, only a few drops of the oxidation products (condensate) were needed for analysis.

The condensate was then analyzed with an FTIR infrared spectrometer as in Example 1. The concentration of dueterium atoms in the condensate was found to be 9.5%. Deuterium concentration in deuterated ethane containing five protiums and one deuterium atom, is 16.67%. Thus, a 9.5% deuterium concentration equates to a 57% (9.5/16.67) extraction efficiency of deuterium from the available ethene.

EXAMPLE 5

A continuous flow experiment with the same experimental apparatus used in Example 3 was performed. The reactant tank was flushed with hydrogen and then charged with deuterium to 6.0 psig, subsequently with ethene to 6.0 psig, and finally with hydrogen to 120 psig. This produced an admixture having a ratio of hydrogen:deuterium:ethene of approximately 20:1:1.

Approximately 115 cc (207.85 g) of zirconium oxide catalyst was added to the glass reactor. The catalyst was obtained from Harshaw/Filtrol and is identified as zirconia catalyst/Zr-0304 T 1/8/E149-1-16-2. This particular catalyst made and has been discontinued by the manufacturer.

The catalyst was prepared by exposing the catalyst to carbon monoxide for approximately 12 hours to condition the zirconium to the +4 oxidation state and by heating the catalyst in the presence of nitrogen to a temperature of 503° F. to drive off any moisture.

The reactant feed to the glass reactor was turned on and held constant. A flow rate of 17 cc/min was maintained for two and a half hours. Temperature of the glass reactor was 270° F. during the reaction.

The reaction products that exited the reactor were condensed in a condensor submersed in liquid nitrogen. A vacuum was then pulled on a second reactant tank. The condensate was removed from the liquid nitrogen and vaporized into the second reactant tank. The second reactant tank was then charged with dry air to 80 psig.

Chromium catalyst in the another glass reactor was reconditioned by exposing the catalyst to carbon monoxide and then heated to a temperature of 565° F. The feed from the second reactant tank was then turned on and held constant. A flow of 300 cc/min was maintained until the pressure in the reactant tank was insufficient to maintain flow. Flow continued until all flow ceased. Initial temperature of the glass reactor was 575° F. during the reaction. The reaction products that exited the reactor were condensed in dry ice. Condensate yield was 1.175 g.

The condensate was then analyzed with an FTIR infrared spectrometer as in Example 1. The average concentration of dueterium atoms in four samples of the condensate was found to be 10.9%. This corresponds to a 65% efficiency in extraction of the deuterium atoms.

EXAMPLE 6

A continuous flow adsorption experiment with the same experimental apparatus as in Example 1 was performed. The reactant tank was flushed with hydrogen, and then charged with hydrogen to 3 psig, subsequently with deuterium to 5.8 psig, and finally with hydrogen to 46 psig. This produced an admixture having a ratio of hydrogen:deuterium of approximately 22:1.

Approximately 125 cc of chromium oxide catalyst was added to the glass reactor.

The catalyst was obtained from Harshaw and is identified as Cr-0211-T, 5/32". The manufacturer's specification for this catalyst was the same as the catalyst used in Example 3. The catalyst was then prepared by exposing the catalyst to carbon monoxide and then heating the catalyst to a temperature of 610° F. to drive off any moisture.

The reactant feed to the glass reactor was turned on and held constant. A flow rate of 300 cc/min was maintained until the pressure in the reactant tank was insufficient to maintain this flow. Flow continued until all flow ceased. The temperature of the glass reactor was 275° F. during the reaction. The reactant products that exited the glass reactor were passed through the condenser cooled in dry ice/acetone bath, but no condensate was obtained.

A stream of dry air from a second reactant tank was then fed to the glass reactor and held constant A flow rate of 150 cc/min was maintained until condensation ceased to be observed. A temperature of 580° F. was maintained during the reaction.

The reaction products that exited the reactor were condensed in dry ice. Condensate yield was 0.35 g. The condensate was then analyzed with a FTIR infrared spectrometer as in Example 1. The concentration of deuterium atoms in the condensate was found to be 22%.

EXAMPLE 7

A continuous flow adsorption experiment with the same experimental apparatus as in Example 6 was performed. The reactant tank was flushed with hydrogen, then charged with hydrogen to 2 psig., subsequently with deuterium to 2.5 psig, and finally with hydrogen to 350 psig. This produced an admixture having a ratio of hydrogen deuterium of approximately 700:1.

Approximately 125 cc of chromium oxide catalyst identical to that used in example 6 was added to the glass reactor. The catalyst was then prepared by exposing the catalyst to air and then heating the catalyst to a temperature of 582° F.

The reactant feed to the glass reactor was turned on and held constant. A flow ratio of 200 cc/min. was maintained until the pressure in the reactant tank was insufficient to maintain flow. Flow continued until all flow ceased. The temperature of the glass reactor was 265° F. during the reaction. The reactant products that exited the glass reacted were passed through a condenser cooled in dry ice, but no condensate was obtained.

A stream of dry air from a second reactant tank was then fed to the glass reactor and held constant. A flow rate of 100 cc/min was maintained until condensation ceased to be observed. A temperature of 582° F. was maintained during the reaction.

The reaction products that exited the reactor and were condensed in dry ice. Condensate yield was 0.2 g. The condensate was then analyzed with an FTIR infrared spectrometer as in Example 1. The concentration of deuterium atoms in the condensate was found to be 19–26%. It is believed that absorption reactor containing 10 to 15 times more material would yield an efficiency in extraction of the deuterium atoms approaching 100%.

EXAMPLE 8

A static experiment was performed in a 300 ml autoclave. Approximately 200 cc of chromium oxide catalyst identical to that used in example 3 was conditioned and placed in the autoclave. The autoclave was evacuated and pressured to 4 psig with an admixture having a ratio of hydrogen:deuterium:ethene of approximately 20:1:0.5. The autoclave was pressured with pure hydrogen resulting in a hydrogen to deuterium ratio of 2000:1 and heated to reaction temperature resulting in a reaction pressure of 1600 psig.

Because the final product was less than 500 ppm, the results had to be analyzed with a mass spectrometer. This analysis was performed by NASA-Lewis Research Center in Cleveland, Ohio. The product analysis showed that 68.1% of the ethene reacted to $C_2H_5D$, which corresponds to an extraction efficiency of 68.1%.

From the foregoing, it will be apparent to those skilled in the art that many reactants may be chosen that will selectively react with a deuterium-containing compound in the presence of a catalyst chosen for this purpose. Catalysts for those reactions may be chosen for this purpose in accordance with the guidelines set forth herein.

It will also be apparent the methods disclosed herein will be useful not only to collect desirable isotopes, but also to remove isotopes that are contaminants in small concentrations. For example, tritium is a problem contaminant in water and heavy water used to cool nuclear reactors. Using the processes of this invention, tritium may be selectively reacted from such contaminated water to form that a product that can then be more readily removed from the water.

It will also be apparent to those skilled in the art that various modifications and variations can be made in the present invention without departing from the scope or spirit of the invention. Thus, it is intended that the present invention cover the modifications and variations of this invention provided that they come within the scope of the appended claims or their equivalents.

What is claimed is:

1. A method for concentrating a desired isotrope of a chemical element from a starting admixture comprising the desired isotope and an undesired isotope of the chemical element which comprises:

reacting the starting admixture with one or more reactants in the presence of a catalyst to catalyze a reaction selectively with the desired isotope to form reaction products where the concentration of the desired isotope relative to the concentration of the undesired isotope in the reaction products is at least about two times greater than the concentration of the desired isotope relative to the concentration of the undesired isotope in the starting admixture.

2. A method according to claim 1 wherein the desired isotope has an atomic weight of less than about 22.

3. A method according to claim 1 wherein the desired isotope is tritium.

4. A method according to claim 1 wherein the concentration of the desired isotope relative to the concentration of the undesired isotope in the reaction products is at least ten times greater than the concentration of the desired isotope relative to the concentration of the undesired isotope in the starting admixture.

5. A method for concentrating deuterium from a starting admixture comprising a deuterium compound and other compounds of hydrogen isotopes which comprises:

reacting the starting admixture with a reactant in the presence of a catalyst to catalyze a reaction selectively between the deuterium compound and said reactant to form reaction products where the concentration of deuterium relative to the concentration of the other hydrogen isotopes in the reaction products is at least about two times greater than the concentration of deuterium relative to the concentration of the other hydrogen isotopes in the starting admixture.

6. A method according to claim 5 wherein the concentration of deuterium relative to the concentration of the other hydrogen isotopes in the reaction products is at least ten times greater than the concentration of deuterium relative to the concentration of the other hydrogen isotopes in the starting admixture.

7. A method for concentrating deuterium from a starting admixture comprising hydrogen deuteride and other compounds of hydrogen isotopes which comprises:

reacting the starting admixture with a reactant in the presence of a catalyst to catalyze a reaction selectively between hydrogen deuteride and said reactant to form reaction products where the concentration of deuterium relative to the concentration of the other hydrogen isotopes in the reaction products is at least about two times greater than the concentration of deuterium relative to the concentration of the other hydrogen isotopes in the starting admixture.

8. A method according to claim 7 wherein the concentration of deuterium relative to the concentration of the other hydrogen isotopes in the reaction products is at least ten times greater than the concentration of deuterium relative to the concentration of the other hydrogen isotopes in the starting admixture.

9. A method for concentrating deuterium from a starting admixture comprising hydrogen deuteride and other compounds of hydrogen isotopes which comprises the steps of:
   (a) reacting the starting admixture with a source of oxygen in the presence of a catalyst to catalyze oxidation selectively of hydrogen deuteride to form reaction products where the concentration of deuterium relative to the concentration of the other hydrogen isotopes in the reaction products is greater than the concentration of deuterium relative to the concentration of the other hydrogen isotopes in the starting admixture, and
   (b) recovering the reaction products of step (a).

10. A method according to claim 9 wherein the catalyst is selected from vanadium, chromium, zinc, praesodymium, and compounds thereof.

11. A method according to claim 9 wherein the catalyst is selected from vanadium in the +2 oxidation state, chromium in the +3 oxidation state, zinc in the +2 oxidation state, praesodymium in the +3 oxidation state, and compounds thereof.

12. A method according to claim 9 wherein the catalyst is selected from $Cr_2O_3$ and $ZnO$.

13. A method according to claim 9 wherein the reaction is carried out at a temperature of less than 700° F.

14. A method according to claim 9 wherein the reaction is carried out at greater than atmospheric pressure.

15. A method according to claim 9 wherein the deuterium recovered has a concentration at least 10 times greater than the concentration of hydrogen deuteride in said membrane.

16. A method according to claim 9 wherein the concentration of deuterium relative to the concentration of the other hydrogen isotopes in the reaction products is at least about two time greater than the concentration of deuterium relative to the concentration of the other hydrogen isotopes in the starting admixture.

17. A method for concentrating deuterium from a starting admixture comprising hydrogen deuteride and other compounds of hydrogen isotopes which comprises the steps of:
   (a) reacting the starting admixture with a reactant capable of undergoing hydrogenation in the presence of a catalyst to catalyze a reaction selectively between hydrogen deuteride and said reactant to form reaction products where the concentration of deuterium relative to the concentration of the other hydrogen isotopes in the reaction products is at least about two times greater than the concentration of deuterium relative to the concentration of the other hydrogen isotopes in the starting admixture,
   (b) recovering the reaction products of step (a) with a source of oxygen, and
   (c) recovering the reaction products of step (b).

18. A method according to claim 17 wherein the concentration of deuterium relative to the concentration of the other hydrogen isotopes in the reaction products is at least ten times greater than the concentration of deuterium relative to the concentration of the other hydrogen isotopes in the starting admixture.

19. A method for concentrating deuterium from a starting admixture comprising hydrogen deuteride and other compounds of hydrogen isotopes which comprises the steps of:
   (a) reacting the starting admixture with a reactant selected from ethene, acetylene, and their homologues in the presence of a catalyst to catalyze a reaction selectively between hydrogen deuteride and said reactant to form reaction products where the concentration of deuterium relative to the concentration of the other hydrogen isotopes in the reaction products is at least about two times greater than the concentration of deuterium relative to the concentration of the other hydrogen isotopes in the starting admixture,
   (b) recovering the reaction products of step (a) with a source of oxygen, and
   (c) recovering the reaction products of step (b).

20. A method according to claim 19 wherein the reactant is selected from ethene and its homologues.

21. A method according to claim 19 wherein the reactant is ethene.

22. A method according to claim 20 wherein the catalyst is selected from chromium, yttrium, zirconium, gadolinium, and compounds thereof.

23. A method according to claim 20 wherein the catalyst is selected from chromium in the +2, +3, and +6 oxidation states, yttrium in the +1 oxidation state, zirconium in the +4 oxidation state, gadolinium in the +1 oxidation state, and compounds thereof.

24. A method according to claim 20 wherein the catalyst is selected from the $Cr_2O_3$ and $ZrO_2$.

25. A method according to claim 20 wherein the reaction between hydrogen deuteride and the reactant is carried out at a temperature of between ambient and 300° F.

26. A method according to claim 20 wherein the reaction between the deuterated reaction product and a source of oxygen is carried out at a temperature of between 500° and 600° F.

27. A method according to claim 20 wherein the reaction between hydrogen deuteride and the reactant is carried out at greater than atmospheric pressure.

28. A method according to claim 20 wherein the hydrogen deuterium recovered has a concentration of at least 10 times the concentration of hydrogen deuteride in said admixture.

29. A method according to claim 19 wherein the reactant is selected from acetylene and its homologues.

30. A method according to claim 19 wherein the reactant is acetylene.

31. A method according to claim 29 wherein the catalyst is selected from calcium, titanium, lanthanum, and compounds thereof.

32. A method according to claim 29 wherein the catalyst is selected from calcium in the +2 oxidation state, titanium in the +2 oxidation state, lanthanum in the +3 oxidation state, and compounds thereof.

33. A method according to claim 19 wherein the concentration of deuterium relative to the concentration of the other hydrogen isotropes in the reaction products is at least ten times greater than the concentration of deuterium relative to the concentration of the other hydrogen isotopes in the starting admixture.

34. A method for concentrating deuterium from a starting admixture comprising hydrogen deuteride and other compounds of hydrogen isotopes which comprises the steps of:
- (a) contacting the starting admixture with a catalyst to absorb hydrogen deuteride and catalyze selectively the oxidation of hydrogen deuteride,
- (b) reacting the adsorbate of step (a) with a source of oxygen to form reaction products where the concentration of deuterium relative to the concentration of the other hydrogen isotopes in the reaction products is at least about two times greater than the concentration of deuterium relative to the concentration of the other hydrogen isotopes in the starting admixture, and
- (c) recovering the reaction products of step (b).

35. A method according to claim 34 wherein the catalyst is $Cr_2O_3$.

36. A method according to claim 34 wherein the adsorption of hydrogen deuteride onto the catalyst is carried out at a temperature of between ambient and 300° F.

37. A method according to claim 34 wherein the reaction of adsorbed hydrogen deuteride with a source of oxygen is carried out at a temperature of between 500° and 900° F.

38. A method according to claim 34 wherein the adsorption of hydrogen deuteride onto the catalyst is carried out at greater than atmospheric pressure.

39. A method according to claim 34 wherein the hydrogen deuterium oxide recovered has a concentration at least 10 times greater than the concentration of hydrogen deuteride in said admixture.

40. A method according to claim 34 wherein the concentration of deuterium relative to the concentration of the other hydrogen isotopes in the reaction products is at least ten times greater than the concentration of deuterium relative to the concentration of the other hydrogen isotopes in the starting admixture.

41. A method for producing deuterium oxide with comprises the steps of:
- (a) reacting the starting admixture comprising hydrogen deuteride and other compounds of hydrogen isotopes with source of oxygen in the presence of a catalyst to catalyze selectively the oxidation of hydrogen deuteride to from reaction products where the concentration of deuterium relative to the concentration of the other hydrogen isotopes in the reaction products is greater than the concentration of deuterium relative to the concentration of the other hydrogen isotopes in the starting admixture, and
- (b) recovering deuterium oxide from the reaction products of step (a).

42. A method according to claim 41 wherein the concentration of deuterium relative to the concentration of the other hydrogen isotopes in the reaction products is at least about two times greater than the concentration of deuterium relative to the concentration of the other hydrogen isotopes in the starting admixture.

43. A method for producing deuterium oxide which comprises the steps of:
- (a) reacting the starting admixture comprising hydrogen deuteride and other compounds of hydrogen isotopes with a reactant selected from ethene, acetylene, and their homologues in the presence of a catalyst to catalyze a reaction selectively between hydrogen deuteride and said reactant to form reaction products where the concentration of deuterium relative to the concentration of the other hydrogen isotopes in the reaction products is at least about two times greater than the concentration of deuterium relative to the concentration of the other hydrogen isotopes in the starting admixture,
- (b) reacting the reaction products of step (a) with a source of oxygen, and
- (c) recovering deuterium oxide from the reaction products of step (b).

44. A method according to claim 43 wherein the concentration of deuterium relative to the concentration of the other hydrogen isotopes in the reaction products is at least ten times greater than the concentration of deuterium relative to the concentration of the other hydrogen isotopes in the starting admixture.

45. A method for producing deuterium oxide which comprises the steps of:
- (a) contacting a starting admixture comprising hydrogen deuteride and other compounds of hydrogen isotopes with a catalyst to absorb hydrogen deuteride and catalyze selectively the oxidation of hydrogen deuteride,
- (b) reacting the absorbate of step (a) with a source of oxygen to form reaction products where the concentration of deuterium relative to the concentration of the other hydrogen isotopes in the reaction products is at least about two times greater than the concentration of deuterium relative to the concentration of the other hydrogen isotopes in the starting admixture, and
- (c) recovering deuterium oxide from the reaction products of step (b).

46. A method according to claim 45 wherein the concentration of deuterium relative to the concentration of the other hydrogen isotopes in the reaction products is at least ten times greater than the concentration of deuterium relative to the concentration of the other hydrogen isotopes in the starting admixture.

* * * * *

UNITED STATES PATENT AND TRADEMARK OFFICE
CERTIFICATE OF CORRECTION

PATENT NO. : 4,996,033

DATED : February 26, 1991

INVENTOR(S) : Gardner-Chavis et al.

It is certified that error appears in the above-identified patent and that said Letters Patent is hereby corrected as shown below:

Claim 15, column 19, line 40, "membrane" should be --admixture--.

Claim 16, column 19, line 44, "time" should be --times--.

Claim 41, column 21, line 42, "with" should be followed by --a--; line 44, "from" should be --form--.

Claim 45, column 22, line 35, "absorb" should be --adsorb--; line 38, "absorbate" should be --adsorbate--.

Signed and Sealed this

Sixth Day of October, 1992

Attest:

DOUGLAS B. COMER

Attesting Officer

Acting Commissioner of Patents and Trademarks